(12) United States Patent
Dray

(10) Patent No.: US 6,464,488 B2
(45) Date of Patent: *Oct. 15, 2002

(54) SLIDING RING NON-RETURN VALVE

(76) Inventor: Robert F. Dray, 6610 Mimosa La., Dallas, TX (US) 75230

( * ) Notice: Subject to any disclaimer, the term of this patent is extended or adjusted under 35 U.S.C. 154(b) by 0 days.

This patent is subject to a terminal disclaimer.

(21) Appl. No.: 09/811,372

(22) Filed: Mar. 15, 2001

(65) Prior Publication Data

US 2002/0005219 A1 Jan. 17, 2002

Related U.S. Application Data

(63) Continuation of application No. 09/072,321, filed on May 4, 1998, now Pat. No. 6,203,311.

(51) Int. Cl.[7] .............................................. B29C 45/52
(52) U.S. Cl. ....................................... 425/562; 425/563
(58) Field of Search ................................ 425/208, 562, 425/563, DIG. 224, 564

(56) References Cited

U.S. PATENT DOCUMENTS

| | | | | |
|---|---|---|---|---|
| 3,698,694 A | * | 10/1972 | Zeug et al. ..................... 366/78 |
| 4,076,485 A | * | 2/1978 | Sokolow ....................... 425/562 |
| 4,106,113 A | * | 8/1978 | Laimer et al. ................. 366/79 |
| 4,349,044 A | * | 9/1982 | Schirmer ............... 123/568.28 |
| 4,477,242 A | * | 10/1984 | Eichlseder et al. ....... 264/328.1 |
| 4,643,665 A | * | 2/1987 | Zeiger ......................... 366/77 |
| 4,850,851 A | * | 7/1989 | Dinerman ................... 425/562 |
| 5,151,282 A | * | 9/1992 | Dray ........................... 425/562 |
| 5,158,784 A | * | 10/1992 | Semmekrot ................. 264/349 |
| 5,167,971 A | * | 12/1992 | Gill et al. .................... 425/559 |
| 5,182,118 A | * | 1/1993 | Hehl ....................... 425/192 R |
| 5,240,398 A | * | 8/1993 | Akaguma et al. ........... 425/146 |
| 5,258,158 A | * | 11/1993 | Dray ........................ 264/328.1 |
| 5,401,161 A | * | 3/1995 | Long .......................... 425/563 |
| 5,470,514 A | * | 11/1995 | Dray ........................ 264/328.1 |
| 5,518,394 A | * | 5/1996 | Shiozawa et al. ........... 425/562 |
| 5,756,037 A | * | 5/1998 | Kitamura ................. 264/328.1 |
| 5,945,141 A | * | 8/1999 | Shirota et al. .............. 425/563 |
| 6,203,311 B1 | * | 3/2001 | Dray .......................... 425/562 |

FOREIGN PATENT DOCUMENTS

| DE | 2635144 | * | 2/1978 |
|---|---|---|---|
| WO | 92/20508 | * | 11/1992 |
| WO | 97/19800 | * | 6/1997 |

\* cited by examiner

Primary Examiner—Jill L. Heitbrink (57) ABSTRACT

A sliding ring non-return valve primarily for use with an injection molding machine utilizes a frame having cut therein one or more longitudinal grooves. Material flows around the outer edge of a flange surface, into an inlet area, and through the longitudinal grooves in the frame's outer surface before entering an accumulation volume. A ring, dimensioned to fit slidably around the frame, blocks material flow into the grooves while in an upstream position and allows material to pass through the grooves while in a downstream position. In an alternative embodiment, the non-return valve utilizes a frame that surrounds a central passage accessed by inlets. The outlet passage is located downstream of said inlet and connects the central passage with an accumulation volume. A ring is dimensioned to slidably fit around the frame. A flange surface limits the ring's upstream travel, while grooves in the flange surface throttle, or limit, material flow into the inlet area. In an upstream position, the ring blocks material flow into the inlets. In a downstream position, the ring allows positive material flow from the inlet to the outlet. The material backflow around a downstream restraining cap forces the ring to its upstream position prior to the injection stroke.

18 Claims, 8 Drawing Sheets

SLIDING RING NON-RETURN VALVE

This is a Continuation of application Ser. No. 09/072,321 filed May 4, 1998 now U.S. Pat. No. 6,203,311.

TECHNICAL FIELD OF THE INVENTION

The present invention relates to a sliding ring non-return valve. In particular, the valve is used to prevent reverse material flow therethrough in a consistent and repeatable manner while minimizing the potentially damaging friction of the ring against its downstream stop and the surrounding barrel.

BACKGROUND OF THE INVENTION

Injection molding—the process of injecting a quantity, or shot, of molten plastic into a mold—is today one of the world's dominant forms of plastic article manufacture. However, a product uniformity problem plagues this process because of the inability to control perfectly the quantity of material injected into the mold. This imperfection is caused primarily by the failure of a non-return valve, found on most injection molding machines, to close in a consistent, repeatable manner during the injection step.

Non-return valves allow molten plastic to flow from the feed screw to an accumulation volume. Injection occurs when the accumulation volume is full. During injection, the entire valve assembly strokes forward, forcing the molten material from the accumulation volume into the mold. Non-return valves are designed to shut during the injection process, preventing back flow through the valve. A review of the prior art illustrates two primary methods of sealing against material back flow during the injection step: a ring-type shut-off valve or a ball-type check valve. With these methods, as the injection ram strokes forward, a ball or piston is forced against a seat or a tapered ring is forced against another ring with a complementary taper. With a ball-type valve, plastic back leakage over the ball creates a pressure drop across the ball. This pressure drop becomes the primary force closing the valve. However, any back leakage variation before the valve closes causes a variation in the quantity of plastic in the accumulation volume.

Figure 1A:
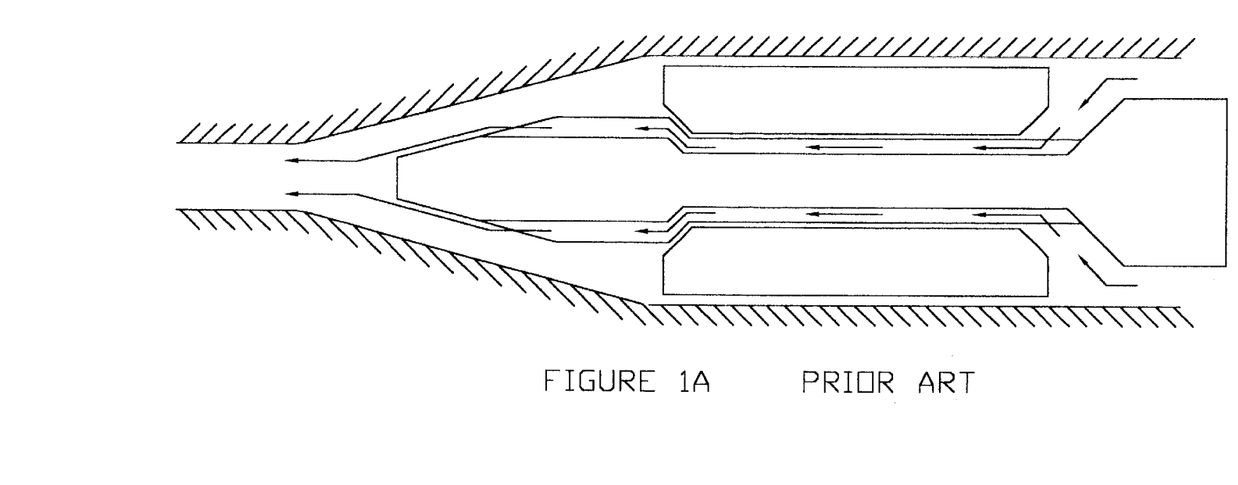
FIG. 1a is a prior art ring valve in its open position.
Figure 1B:
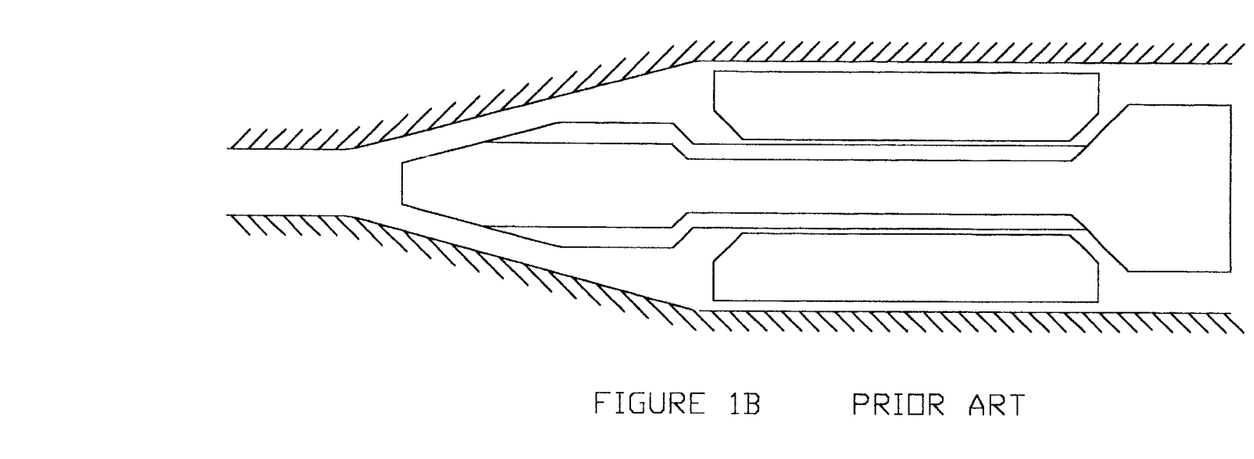
FIG. 1b is a prior art ring valve in its closed position.

Ring-type valves use a cylindrical ring rather than a ball to close the valve. FIGS. 1a and 1b illustrate an example of a prior art ring valve. This ring fits outside the valve body, through which the molten material flows. A barrel contains the entire assembly. The ring's upstream and downstream travel are limited by upstream and downstream retainers. The ring's upstream face is tapered, or angled a certain amount from perpendicular to the valve's longitudinal axis. When open (FIG. 1a), material flows over the ring's upstream stop, between the upstream face and the upstream retainer, under the ring through grooves in the valve body, and out of the valve through grooves in the downstream stop. When closed (FIG. 1b), the ring's upstream face's tapered surface contacts the upstream stop's complimentary surface, forming a sealing surface and blocking flow through the valve. Thus, when the ring is in its downstream position, the valve's flowpath is open; when upstream, the ring blocks the flowpath. Existing ring valves require a land length for sealing. The greater the length of this sealing surface, or land length, the better the seal. The ring/valve body assembly is attached to the downstream end of a feed screw. As the screw rotates, it feeds material into the non-return valve. The material forces the ring to its open position, allowing the material to flow through the valve and into an accumulation volume.

Ring valves do not rely upon a back leakage-induced pressure drop to close the valve. Instead, ring valves rely upon a very tight clearance between the ring's outer diameter and the barrel's inner diameter to create a friction force that holds the ring in place as the valve body strokes forward during injection, forcing the shot of plastic out of the valve and into the mold. In other words, when the valve body strokes forward, the friction force tends to hold the ring in place relative to the stationary barrel. As the valve moves forward within the barrel, the ring moves upstream relative to the valve body, blocking the material flowpath. The friction force between the ring and the barrel also opposes the ring's downstream travel when the screw begins to rotate and feeds material into the valve body. This reduces the ring's downstream velocity relative to the valve body and the resultant force with which it impacts the downstream retainer.

The friction between the ring and the barrel also creates a force opposing the rotation of the ring along with the valve body when the screw rotates and feeds material through the valve body. Thus, the valve body tends to rotate inside the ring, which is held almost stationary against the barrel's inner surface by the friction force. Because the valve's downstream retainer rotates with the valve body, and the ring's downstream surface contacts the downstream retainer, a rotational friction force results between the ring's downstream seating surface and the retainer. This results in wear of the ring—shortening the ring—and of the retainer. The resulting erosion of these surfaces increases the distance that the ring must travel upstream during injection to cover the valve inlets, increasing valve closure time and valve leakage prior to closing. As cumulative wear between the ring's outer surface and the barrel's inner surface increases the clearance between the ring and the barrel, the friction force decreases and dynamic forces created by the material flow become the primary forces shutting the valve. However, these same flow-induced dynamic forces can cause the ring to open too quickly and impact with great velocity upon the ring's downstream retaining device. Moreover, the decreased friction between the ring and barrel allows the ring to impact the downstream retainer with greater velocity. Finally, while a longer land length, or sealing surface, minimizes leakage through the valve, the increased surface area of the ring's upstream surface results in a greater force (for a given pressure) upon the ring in the downstream direction when flow-induced dynamic forces close the valve. Over the valve's life, this impact can cause increased wear and even premature valve failure. To minimize ring and downstream stop erosion, prior art valves are often necessarily constructed of very hard materials, such as H-13 tool steel, with specially hardened retaining surfaces. These materials are expensive; moreover, their increased brittleness increases the chances of catastrophic failure due to repeated impact.

With both ball and ring type valves, particulate contamination, poor alignment, and wear of the sealing surface worsens back leakage—and consequent injection mass variation—by preventing a perfect seal and allowing back leakage through the valve even after valve closure. Therefore, a need exists for a non-return valve that always furnishes the same shot size regardless of plastic, fillers, contamination, product produced, or wear. This valve should be designed to allow its incorporation into existing injection molding machines or any other device which utilizes a non-return valve. This valve should not depend solely upon leakage through the valve or barrel to ring friction to generate the force necessary to move the valve to its closed position. Furthermore, this valve should be designed so that particles can never impair the seal. Finally, the valve should limit the impact of the closing ring against its retaining devices.

SUMMARY OF THE INVENTION

The present invention is a sliding ring non-return valve designed for use in an injection molding device with a screw-type injection plunger; however, it may be used in any application requiring one-way liquid or gaseous material flow. In its simplest form, the valve comprises a frame having one or more feed grooves along its outer surface through which the material flows. These grooves may be parallel to the valve's longitudinal axis, but they may be any shape, (helical, for example) as long as they lead from the inlet groove to the accumulation volume at the valve's downstream end. The frame is generally cylindrical and typically has a tapered, conical retaining cap integral to the distal—or downstream—end. The proximal—or upstream—end is threaded to allow for connection to a screw located in a barrel. The valve's outer diameter must closely approximate the barrel's inner diameter. An inlet groove, cut into the frame in a plane perpendicular to the frame's longitudinal axis allows material to flow into the feed grooves. Because material flows through the valve, its proximal end is also referred to as "upstream" and its distal end is also referred to as "downstream."

A ring is dimensioned to fit outside the frame. Unlike existing ring valves, the present invention does not require land length for proper sealing; therefore, the ring may be much thinner than those found on existing ring valves. The clearance between the ring's outer diameter and the barrel's inner diameter is normally greater than existing ring valves. However, leakage between the ring's outer surface and the barrel's inner surface—or external leakage—is prevented both by the clearance and the ring's length. When design considerations require a shorter valve length, ring length may be limited. Thus, a closer clearance may be required to minimize external leakage. Nevertheless, the clearance normally will be greater than the clearances found on existing ring valves. This increased clearance decreases the friction force between the ring and barrel and allows the ring to slide more easily. The retaining cap—an annular cap integral to the valve's downstream end—limits the ring's downstream travel. A flange surface, or disk, with a diameter less than that of the barrel's inner diameter, limits the ring's upstream travel. The flange surface slidably attaches to the frame's upstream end with the feed screw holding the flange in position. When the ring is in an upstream position, the ring blocks the inlet groove; when in a downstream position, the ring partially uncovers this groove.

The screw feeds material, typically molten plastic, through the gap between the flange surface's outer diameter and the barrel's inner diameter. This material reaches the feed grooves via the inlet groove. The material forces the ring towards its downstream position, partially exposing the inlet groove. The valve is designed such that the ring uncovers the minimum area necessary to assure adequate flow into the longitudinal grooves. In effect, the ring, because it only partially opens the inlet groove, throttles material flow. However, because the fluid has to travel only a short distance (essentially, only the edge or chamfer on the ring's lower upstream corner) to the inlets, and the fluid is typically a compressible, elastic fluid such as molten plastic or resin, the pressure drop across the inlet groove opening is minimized.

The difference between the cross-sectional area of the flange surface and the barrel is the area through which the material enters the valve from the feed screw. The diameter of the flange surface is designed to limit this area—and, consequently, the flowrate—decreasing the resulting force against the ring's upstream surface and the ring's velocity in the downstream direction. The ring stops against the retaining cap. The material proceeds into the inlet groove and the feed grooves, out of the valve, and into an accumulation volume. When this area collects a selected amount of plastic, the screw stops rotating. Typically, the back pressure, used to assist the screw in melting plastic, is reduced to a minimum. To prevent "drooling," or plastic leakage out of the injection nozzle before injection, the valve and the screw are translated upstream a short, fixed distance. This is called "pullback."

At this point, the mold already contains a quantity of plastic that is cooling. After this previously-produced part cools sufficiently, the mold is opened, the part removed, and the mold again closed. The screw ram then moves forward in the barrel, increasing pressure in the accumulation volume and forcing material into the mold. This pressure tends to push material back into the outlet passage and back through the valve. However, as the screw ram moves forward, it forces material back upstream around the periphery of the retaining cap, pushing the ring to its rearward closed position and blocking material flow into the inlet groove.

The volume of the injected shot is determined by the distance the screw and the valve are displaced in the upstream direction before closure. As material fills the accumulation volume, the screw is displaced rearward away from the accumulation volume. This rearward movement is limited to an exact position corresponding to a given volume of plastic to be injected. When the screw reaches this set position, it stops. No more material is added to the shot. Pullback affects the pressure but the mass remains constant for injection.

Depending upon the material and pressure involved, the valve may shut automatically when the screw stops turning and before pullback. This is called "preclosure," and it occurs as follows: As the feed screw rotates and feeds material through the valve and into the accumulation volume, the pressure in the accumulation volume increases as described above. As the accumulation pressure increases, certain fluids—such as molten plastic and resin—compress. When the screw stops turning and the accumulation volume pressure relaxes, the compressed material expands, flowing around the outside of the downstream retaining cap and applying a force to the ring's downstream seating surface, forcing it upstream to cover the inlet groove and closing the valve. Preclosure further minimizes—and may in fact eliminate completely—valve leakage during the injection step by closing the valve before the screw ram moves forward. Pullback tends to open the valve by applying a negative pressure on the ring's downstream face, forcing the ring downstream a small distance. However, this distance is so small that the valve opening will not typically be exposed after pullback.

In an alternative preferred embodiment, the material flows through the valve's body rather than through grooves cut along the valve body's outer surface. Inlet holes lead from the frame's outer surface to the inner bore of the frame. When the valve is in its closed position, the ring covers the inlets. When open, the ring uncovers these openings. A retaining cap limits the ring's downstream travel. The cap may be threadably attached to the frame's downstream end or may be integral to the frame. A flange surface, which may be integral or removably attached to the frame, attaches to the valve frame just upstream of the inlet holes and downstream of the screw, limits the ring's upstream travel. The flange surface has one or more grooves cut into its periphery. Material flows from the feed screw into the valve's inlets through these grooves. The dimensions of these grooves are such that the combined cross sectional area of the grooves approximates the combined cross sectional areas of the inlet holes. Other than these design differences, the alternative embodiment operates in essentially the same manner as the above-described design.

Unlike prior art sliding ring and ball check valves, closing either embodiment does not require undesired leakage flow across the valve. Thus, the ring closes quickly and repeatably at the start of the injection step. The ring will also minimize clogging and leakage after closure because it will shear away any contaminants in its way. Finally, because the disclosed valve does not rely on a tight clearance between the ring and the barrel for proper operation, erosion due to friction is less of a concern. Thus, the valve may be constructed of less expensive, less exotic, softer materials.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE DRAWINGS

The present invention is a positive-type non-return valve overcoming many of the disadvantages found in the prior art. FIGS. 2 through 5 disclose a sliding ring non-return valve embodying the present invention. The valve 100 allows material to pass through it when screw is rotating but closes when the screw is translated forward with no screw rotation.

Valve 100 is typically made of steel and used as part of an injection molding machine unit having a barrel, with an injection nozzle on one end of the barrel and a screw on the other end and movable in the barrel. Unlike prior art valves that are constructed of very hard materials (such as H-13 tool steel) due to high friction forces between the ring and other components, the present invention may be constructed of softer, less expensive materials, such as 4140 steel.

Figure 2:
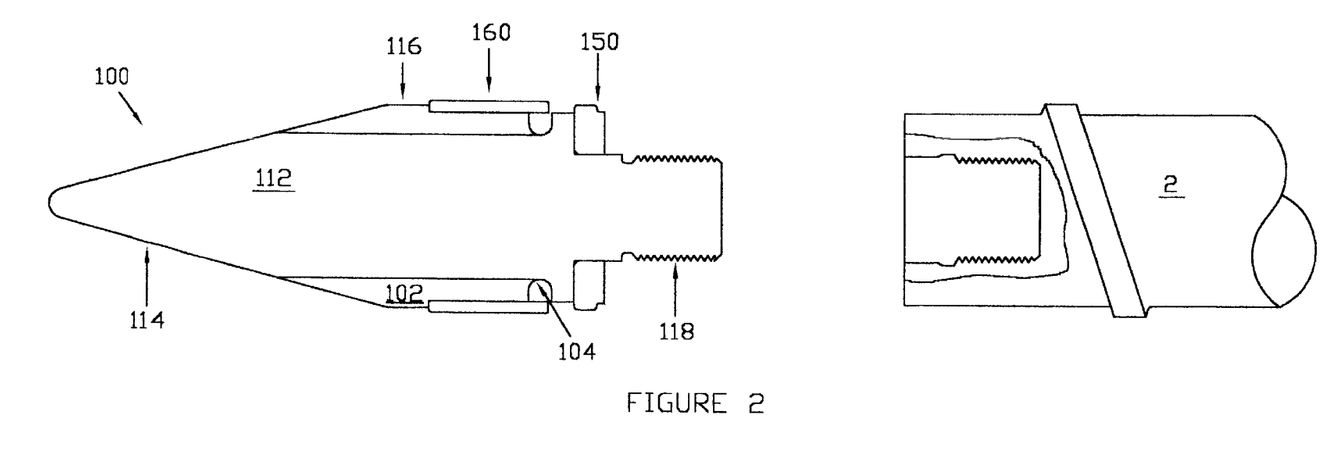
FIG. 2 is a cross-sectional view showing the valve in its open position.
Figure 3:
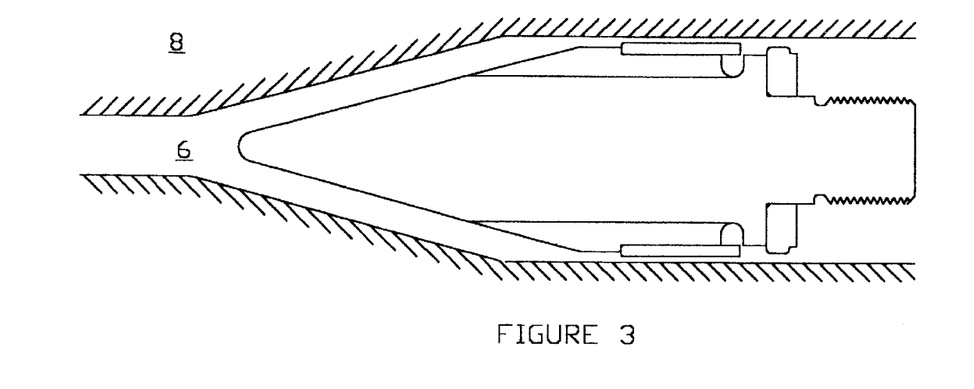
FIG. 3 is a cross-sectional view showing the valve in its closed position.

The non-return valve 100 is attached to or is a part of screw 2, as shown in FIG. 2, both of which are located in a barrel 8, shown in FIG. 3, with an accumulation volume 6 located downstream of valve 100. Both the screw 2 and valve 100 slidably fit within the barrel. Valve 100 comprises a generally cylindrical frame 112. A cap 116 or other retaining means with an included or tapered surface 114 on its downstream end is integral to frame 112. A ring 160 is dimensioned to slidably fit around frame 112. Valve 100 contains at least one groove 102, through which the material flows. Grooves 102 run along the surface of the valve body and integral retaining cap. The figures illustrate grooves parallel to the valve's longitudinal axis; however, the grooves may take a helical or other shape. Inlet groove 104 is cut along the outer circumference of the valve body near its upstream end. The plane of inlet groove 104 is perpendicular to the valve's longitudinal axis. Flange surface 150 is slidably attached to frame 112 just upstream of inlet groove 104 and just downstream of screw 2. Flange surface 150 serves as an upstream retainer or stop for ring 160. The diameter of flange surface 150 is less than the inner circumference of barrel 8. Thus, molten material flows through an area formed by the gap between flange surface 150 and the inner surface of barrel 8. This area—the area between flange surface 150 and barrel 8—approximates the sum of the cross sectional areas of grooves 102. This creates a throttling effect that minimizes the force on the ring's upstream face. Rotating screw 2 feeds material around the outside of flange surface 150 into inlet groove 104. From inlet groove 104, the material flows into grooves 102 downstream into accumulation volume 6.

The injection method using valve 100 typically involves following steps: recovery, pullback, and injection. "Recovery" occurs after a shot has been injected and the accumulation volume is empty. The valve is shut; ring 160 is in its upstream position. Screw 2 and valve 100 are downstream relative to barrel 8. Screw 2 rotates and plastic flows and feeds material around flange surface 150. The force exerted by the material flowing around—and limited by—flange surface 150 slowly pushes ring 160 to its downstream position. Material next passes into inlet groove 104, through grooves 102, and begins filling accumulation volume 6. As the accumulation volume fills, its pressure increases and this pressure forces the screw rearward. When the screw reaches its preset position—corresponding to the desired amount of plastic, or shot size—the screw stops turning and no additional plastic flows through the valve. A nominal back pressure is applied to the screw to prevent the screw from unscrewing through the material and to set the desired pressure in accumulation volume 6.

"Pullback" occurs after "recovery." During pullback, screw 2 stops its rotation, and screw 2 and valve 100 are pulled back a small distance. Pullback places a slight negative pressure on the ring's downstream face and minimizes any material leakage from the accumulation volume into the mold when the mold is opened. The slight negative pressure will tend to pull the ring slightly downstream.

During "injection," the screw and valve translate forward to inject the shot into a mold. The ring moves automatically to an upstream position against flange surface 150 due to the high material pressure generated in the accumulation volume and the material backflow around the periphery of cap 116 (and through the grooves cut therein) and against the downstream surface of ring 160. In other words, the ring overstrokes the material flowpath. The shot is expelled through the barrel outlet.

Depending upon the materials and pressures involved, the valve may "preclose" when the screw stops turning. Viscoelastic materials—such as certain molten plastics and resins—are compressible. As the accumulation volume pressure increases, these materials in the accumulation volume will compress. When screw 2 stops turning, accumulation volume 6 pressure is relaxed, and the material expands around the outer edge of cap 116 (and through the grooves cut therein) and applies a force against the downstream surface of ring 160, forcing it upstream and over inlet groove 104, closing the valve. "Preclosure," by shutting the valve prior to the commencement of the injection stroke, minimizes or eliminates material leakage back through the valve during injection.

Figure 4:
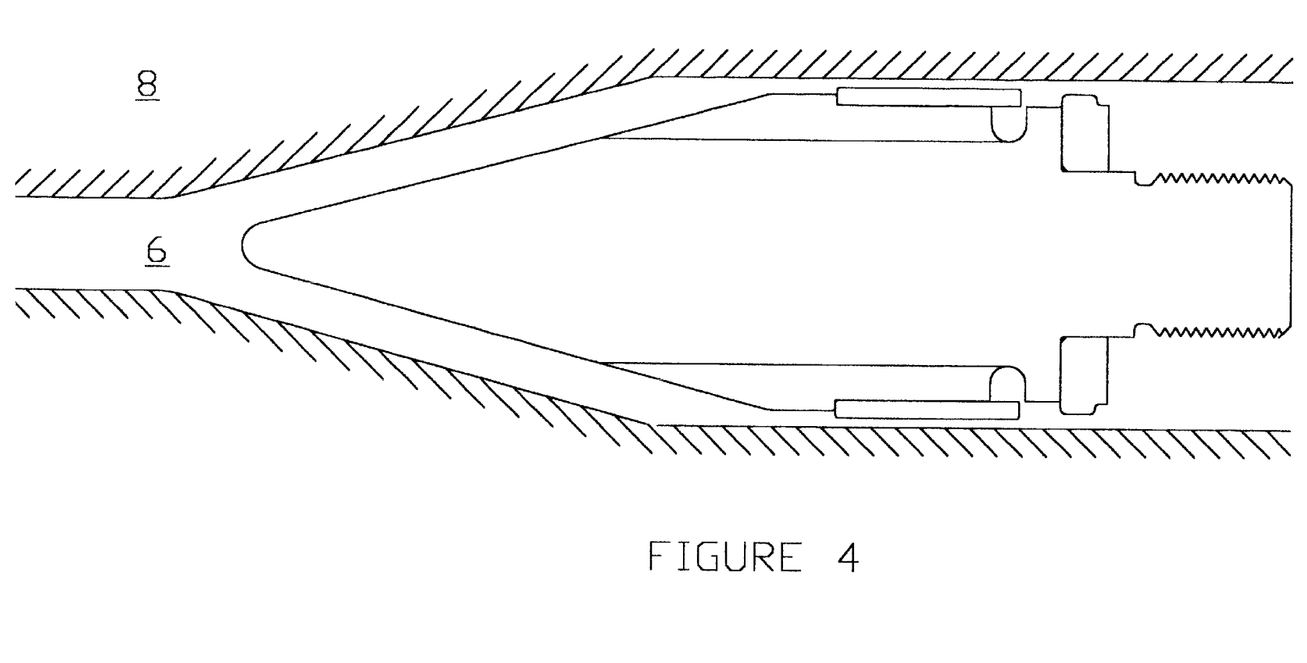
FIG. 4 illustrates the valve in the "pullback after preclose" position.
Figure 5:
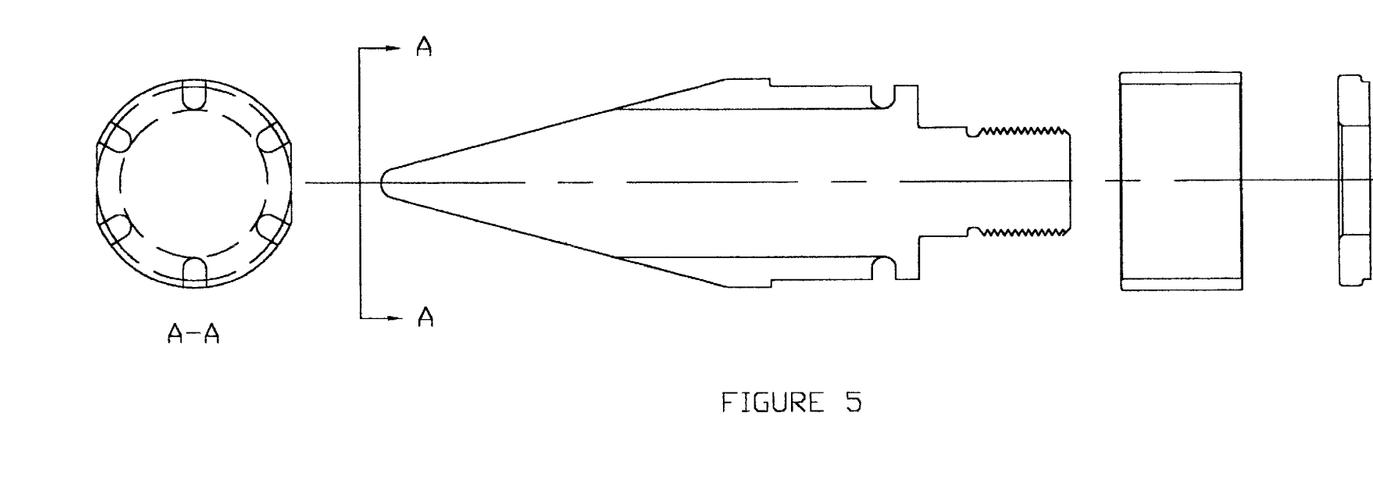
FIG. 5 is an exploded view of the valve.

FIG. 4 illustrates the ring during the "pullback after preclose" stage of the injection method. After preclose, the screw 2 and valve 100 are pulled back in preparation for injection. However, despite the negative pressure experienced by the downstream face of the ring during pullback, the valve remains closed due to the length of the ring extending somewhat beyond the upstream edge inlet groove 104 and the short duration of pullback. In other words, in the shut position the ring's upstream face is some distance upstream of the inlet groove's upstream edge. During pullback, the ring moves downstream such a short distance that it does not uncover the inlet.

In sum, in this preferred embodiment, valve 100 fits into the same area as a prior art non-return valve. The material proceeds downstream between the screw flights due to the rotation of the screw until it encounters the valve 100. As it reaches the valve, the material flows around flange surface 150 and slowly forces ring 160 into a downstream position, exposing inlet groove 104. Material then enters grooves 102. The material follows grooves 102 until it discharges from valve 100 at its downstream end and into accumulation volume 6. When accumulation volume 6 fills to its selected volume, screw 2 stops its rotation. After the previously-molded part is removed from the mold, the forward stroke begins and ring 160 moves to an upstream position blocking inlet groove 104 and creating a positive-shut off.

Figure 6:
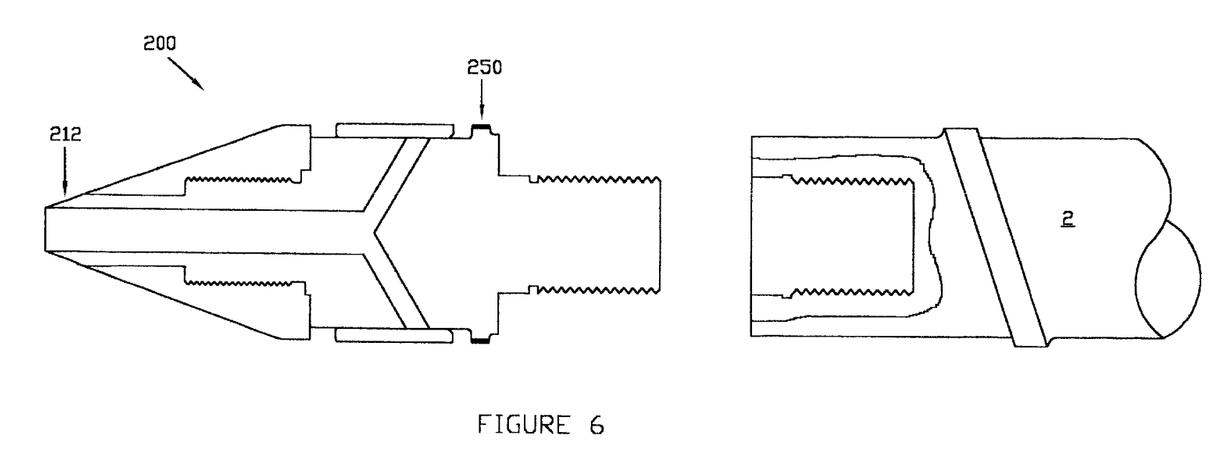
FIG. 6 is a cross-sectional view showing an alternative embodiment in its open position.

Referring to FIGS. 6 to 11 simultaneously, in an alternative preferred embodiment valve 200 comprises a generally cylindrical frame 212 with an attachment surface 218 on the upstream end. A cap 216 or other retaining means with an included or tapered surface 214 on its downstream end and a flow-through central passage 208 attaches to frame 212, typically by a threaded connection 217. A ring 260 is dimensioned to slidably fit around frame 212. The non-return valve 200 is attached to or is a part of screw 2, as shown in FIG. 6, both of which are located in a barrel 8, shown in FIG. 7, with an accumulation volume 6 located downstream of valve 200. Both the screw 2 and valve 200 slidably fit within the barrel. The clearance between ring 260 and the inner surface of barrel 8 is normally greater than in existing sliding ring valves to minimize the friction force between the ring and barrel. Rotating screw 2 feeds material through grooves 252 on flange surface 250 into inlets 230. Inlets 230 lead to a central passage 232, which is coaxial with the barrel, screw and valve 200. Inlets 230 radially extend to the axis 4 of frame 212. Central passage 232 is coaxially located in frame 212 immediately downstream of inlets 230 and extends from inlets 230 to outlet 240 at the downstream end of frame 212.

Figure 7:
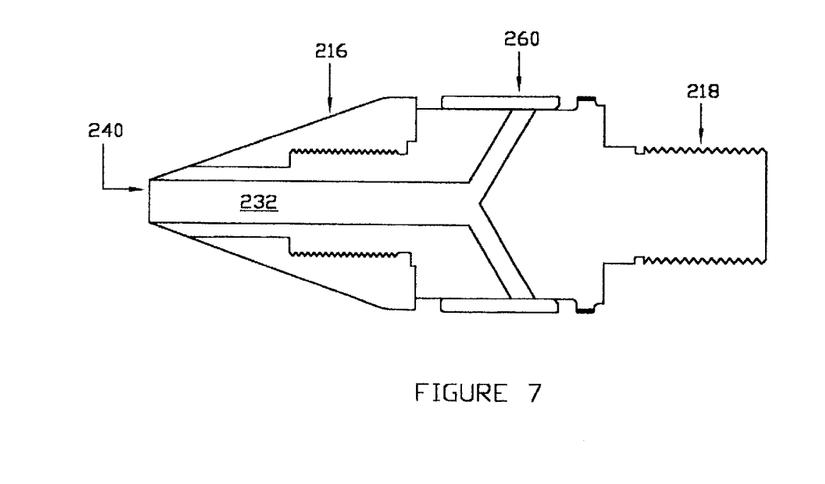
FIG. 7 is a cross-sectional view showing an alternative embodiment in its closed position.

FIGS. 6 and 7 are sectional views of valve 200 showing a typical relationship between inlet 230, outlet 240, and central passage 232. Although four (4) inlets and one (1) outlet are preferred, valve 200 would only require one (1) inlet. The total cross-sectional area of grooves 250 is less than or equal to the total cross-sectional area of the openings to inlets 230.

Ring 260 is dimensioned to fit closely but slidably around frame 212, with a typical clearance on a two and one-half inch (2½") valve of at most three to five (3–5) thousandths of an inch between ring 260 and frame. Cap 216 limits the travel of ring 260 at the downstream end; flange surface 250 limits travel at the upstream end. When ring 260 is in a forward position against cap 216 plastic will flow from inlet 230 into central passage 232 and through outlet 240. In a closed position, ring 260 blocks inlet 230.

The injection method using valve 200 typically involves following steps: recovery, pullback, and injection. "Recovery" occurs after a shot has been injected and the accumulation volume is empty. The valve is shut; ring 260 is in its upstream position. Screw 2 and valve 200 are downstream relative to barrel 8. Screw 2 rotates and plastic flows and feeds material through grooves 252 and inlets 230. The force exerted by the material flowing through—and limited by—grooves 252 slowly pushes ring 260 to its downstream position. Material next passes into central passage 232 and outlet 240 and begins filling accumulation volume 6. As the accumulation volume fills, its pressure increases and this pressure forces the screw rearward. When the screw reaches its preset position—corresponding to the desired amount of plastic, or shot size—the screw stops turning and no additional plastic flows through the valve. A nominal back pressure is applied to the screw to prevent the screw from unscrewing through the material and to set the desired pressure in accumulation volume 6.

"Pullback" occurs after "recovery." During pullback, screw 2 stops its rotation, and screw 2 and valve 200 are pulled back a small distance. Pullback places a slight negative pressure on the ring's downstream face and minimizes any material leakage from the accumulation volume into the mold when the mold is opened. The slight negative pressure will tend to pull the ring slightly downstream.

During "injection," the screw and valve translate forward to inject the shot into a mold. The ring moves automatically to an upstream position against flange surface 250 due to the high material pressure generated in the accumulation volume and the material backflow around the periphery of cap 216 and against the downstream surface of ring 260. In other words, the ring overstrokes the material flowpath. The shot is expelled through the barrel outlet.

Depending upon the materials and pressures involved, the valve may "preclose" when the screw stops turning. Some materials—certain molten plastics and resins—are compressible. As the accumulation volume pressure increases, these materials in the accumulation volume will compress. When screw 2 stops turning, accumulation volume 6 pressure decreases, and the material expands around the outer edge of cap 216 and applies a force against the downstream surface of ring 260, forcing it upstream and over inlets 230, closing the valve. "Preclosure," by shutting the valve prior to the commencement of the injection stroke, minimizes or eliminates material leakage back through the valve during injection.

Figure 8:
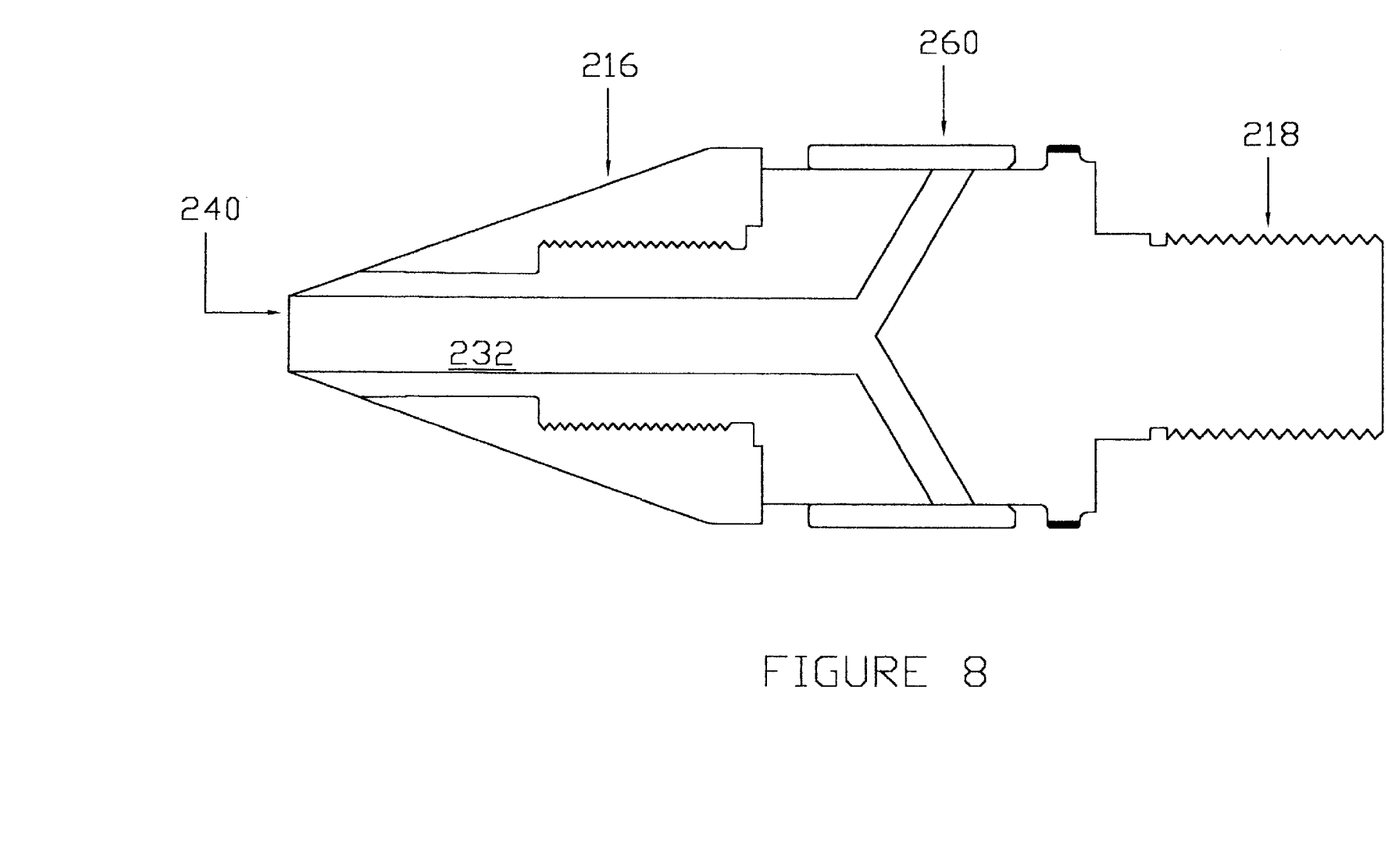
FIG. 8 illustrates an alternative embodiment in the "pullback after preclose" position.
Figure 9:
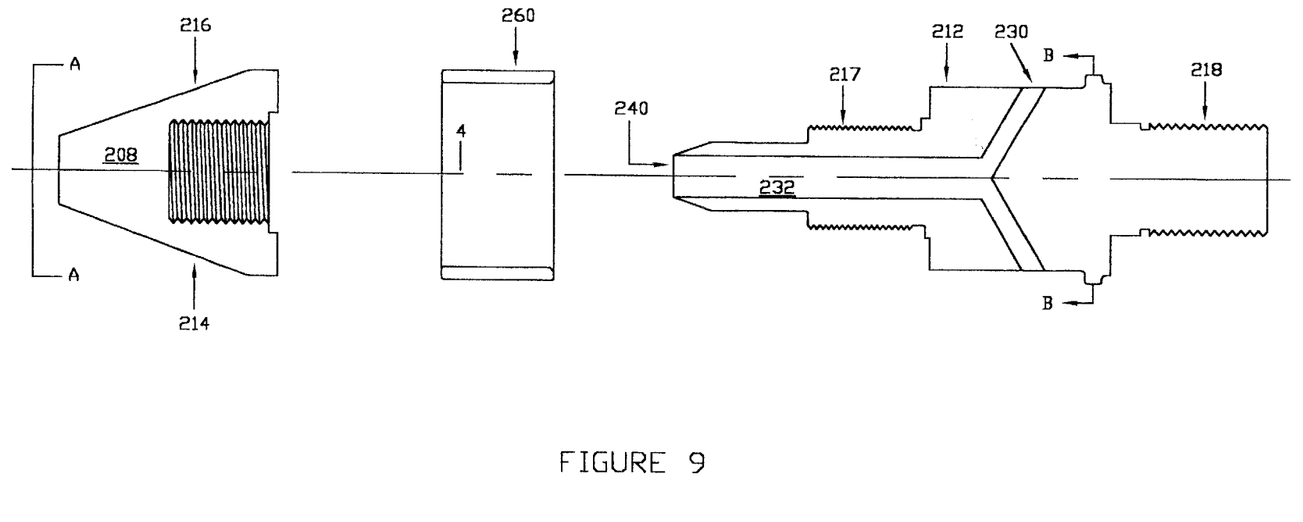
FIG. 9 is an exploded view of an alternative embodiment disassembled.
Figure 10:
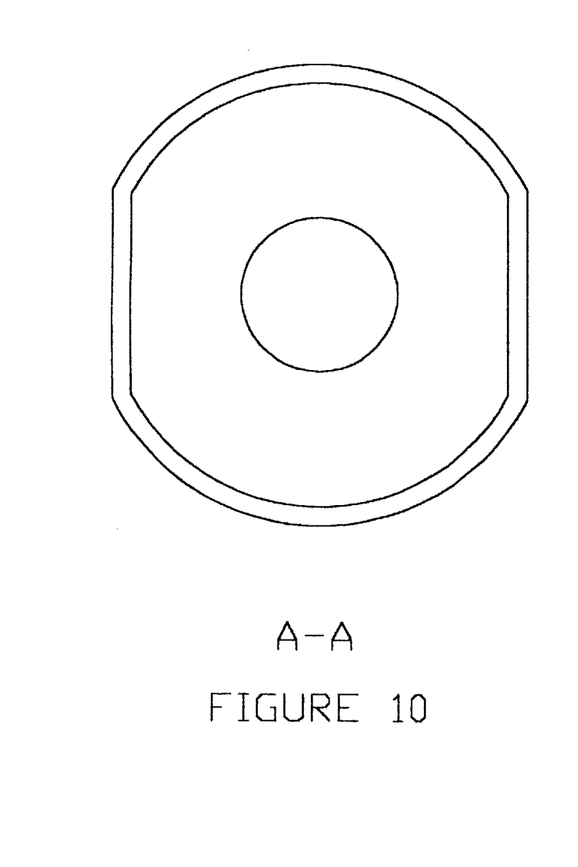
FIG. 10 is view A—A of FIG. 8.
Figure 11:
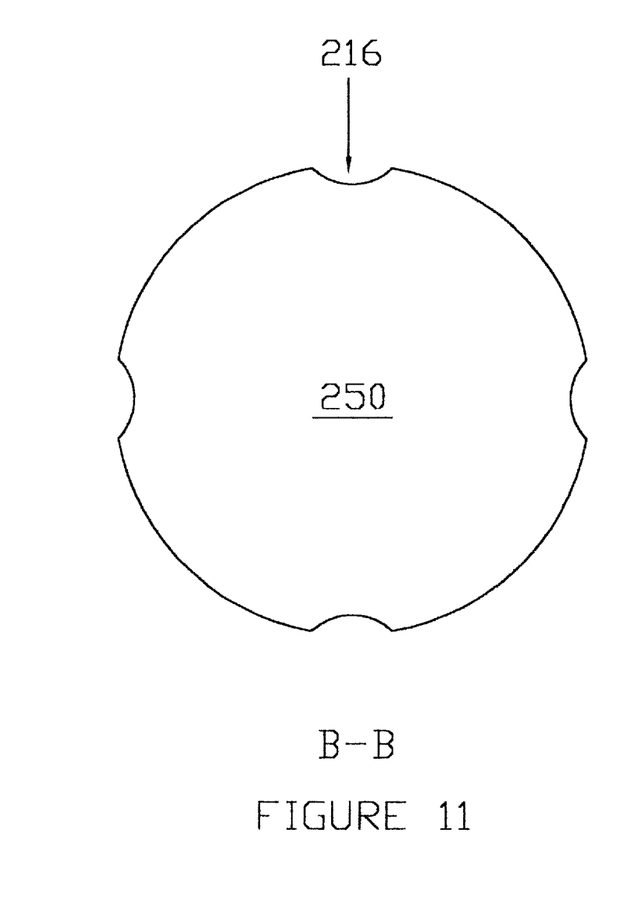
FIG. 11 is view B—B of FIG. 8.

FIG. 8 illustrates the alternative preferred embodiment during the "pullback after preclose" stage of the injection method. After preclose, the screw 2 and valve 200 are pulled back in preparation for injection. However, despite the negative pressure experienced by the downstream face of the ring, the valve remains closed due to the length of the ring extending somewhat beyond the upstream edge of inlets 230 and the short duration of pullback. In other words, in the shut position the ring's upstream face is some distance upstream of the inlet's upstream edge. During pullback, the ring moves downstream such a short distance that it does not uncover the inlet.

In sum, in this preferred embodiment, valve 200 fits into the same area as a prior art non-return valve. The material proceeds downstream between the screw flights due to the rotation of the screw until it encounters the valve 200. As it reaches the valve, the material flows through grooves 252 on flange surface 250 and slowly forces ring 260 into a downstream position, exposing inlets 230. Material then enters the four inlet holes 230 and proceeds to central passage 232. The material follows central passage 232 until it discharges from valve 200 through outlet passage 240 and into accumulation volume 6. When accumulation volume 6 fills to its selected volume, screw 2 stops its rotation. After the previously-molded part is removed from the mold, the forward stroke begins and ring 260 moves to an upstream position blocking inlets 230 and creating a positive-shut off.

Although preferred embodiments of the invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the spirit of the scope of the invention.

I claim:

1. A sliding ring non-return valve comprising:
   a frame having fluid grooves extending generally axially from a proximal end of the frame to a distal end of the frame, a portion of the frame's outer surface defining an axial sealing surface;
   a retainer attached to the proximal end of the frame, a portion of the retainer defining a radial sealing surface;
   an inlet groove formed in the frame and extending at least partially circumferentially about the outer surface of the frame, the inlet groove intersecting the fluid passages at the proximal end of the frame; and
   a ring member, disposed about the frame and at least partially over the fluid grooves and slidable between a closed position in which the inlet groove and fluid grooves in the frame are obstructed and the ring abuts and seals with the axial and radial seal surfaces, and an open position in which the fluid passages are not obstructed.

2. The non-return valve of claim 1 wherein the valve is operatively disposed within a containment barrel.

3. The non-return valve of claim 1 wherein an operational clearance exists between the ring and the barrel.

4. The return of claim 3 wherein the clearance has a cross sectional area less than the cross sectional area of the fluid passages.

5. The non-return valve of claim 1 wherein the retaining means is integral with the distal end of the frame.

6. The non-return valve of claim 2 wherein the grooves are arranged helically around the longitudinal axis of the frame.

7. The non-return valve of claim 1 wherein the valve is constructed of medium-hardness steel.

8. The non-return valve of claim 1 wherein the valve is constructed of 4140 steel.

9. A sliding ring non-return valve for use with a driving screw in a barrel, said driving screw defining a material feed path, the non-return valve comprising:
   a frame slidably disposed within the barrel, said frame having a distal end and a proximal end, the proximal end attached to the driving screw;
   a flange surface formed on the frame between the proximal end and the driving screw, the flange surface having an outer diameter less than the inside diameter of the barrel and defining a radial seal surface;
   a plurality of fluid grooves formed in an outer surface of the frame, the grooves being in communication with the material feed path;
   an annular inlet groove formed in and extending at least partially around the circumference of the outer surface of the frame and intersecting the grooves;
   a retaining cap at the distal end of the frame;
   a ring member disposed on the frame and at least partially overlying the fluid grooves, the ring member being slidable on the frame and over the fluid grooves between the retaining cap and the flange, the ring being slidable between a first position, adjacent the retaining cap, in which the annular inlet groove and fluid grooves are unobstructed and a second position, adjacent the radial sealing surface on the flange, in which the inlet grooves are obstructed.

10. The non-return valve of claim 9 wherein a clearance area is defined between the outer diameter of the flange surface and the inner diameter of the barrel and the clearance area approximates an area defined by the cross-sectional area of the grooves.

11. The non-return valve of claim 9 wherein the retaining cap is integral to the frame.

12. The non-return valve of claim 9 wherein the valve is constructed of medium-hardness steel.

13. The non-return valve of claim 9 wherein the valve is constructed of 4140 steel.

14. A non-return valve for use with a flighted screw rotating and reciprocating within the barrel of an injection molding apparatus, the non-return valve comprising:
   a generally cylindrical frame coupled to the screw at one end and having a generally conical downstream end;
   a flange formed on the frame proximal the end coupled to the screw;
   a retaining member formed on the frame proximal the downstream end of the frame;
   an annular groove formed in the surface of the frame proximal the flange and extending about the circumference of the frame, the annular inlet groove defining a pair of opposing walls spaced apart a selected width;
   a plurality of grooves formed in the surface of the frame intersecting the annular groove and extending to the downstream end of the frame; and
   a ring disposed about the frame and partially overlying the plurality of grooves, the ring being movable between the flange and retaining member responsive to fluid pressure to selectively obstruct the annular groove and at least partially prevent fluid flow through the grooves.

15. The non-return valve of claim 14 wherein the grooves are generally parallel to the axis.

16. The non-return valve of claim 14 wherein the grooves are helical about the axis.

17. The non-return valve of claim 14 wherein relaxation of the working fluid forces the ring into the upstream direction.

18. The non-return valve of claim 14 wherein the upstream position and the downstream position are closely adjacent to one another.

* * * * *